(12) United States Patent
Rice

(10) Patent No.: US 6,786,622 B1
(45) Date of Patent: Sep. 7, 2004

(54) SEARCHLIGHT AND CONTROLLER THEREFORE

(75) Inventor: Dennis Lee Rice, Bellflower, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 202 days.

(21) Appl. No.: 09/657,894

(22) Filed: Sep. 8, 2000

(51) Int. Cl.[7] .............................................. F21V 33/00
(52) U.S. Cl. ..................... 362/362; 362/271; 362/272; 362/286; 362/287; 362/386; 362/428
(58) Field of Search .................... 362/362, 271, 362/272, 286, 287, 386, 428, 427, 35, 524, 526, 284, 324, 269, 370, 371

(56) References Cited

U.S. PATENT DOCUMENTS

| 3,644,728 | A | * | 2/1972 | Hessemer et al. | ......... 240/61.9 |
|---|---|---|---|---|---|
| RE29,266 | E | | 6/1977 | Hessemer et al. | ......... 240/61.9 |
| 4,065,806 | A | | 12/1977 | Satoh | ......................... 362/419 |
| 4,419,721 | A | | 12/1983 | Gregoire et al. | ............ 362/368 |
| 4,930,057 | A | | 5/1990 | Williams | ..................... 362/272 |
| 5,346,317 | A | * | 9/1994 | Williams | ..................... 384/611 |
| 5,584,560 | A | * | 12/1996 | Grosswiller et al. | .......... 362/66 |
| 6,315,435 | B1 | * | 11/2001 | Hamilton et al. | ........... 362/476 |

* cited by examiner

*Primary Examiner*—Stephen Husar
*Assistant Examiner*—Anabel Ton

(57) ABSTRACT

A searchlight including a housing having first and second ends, a window in the first end of the housing and a lamp disposed within the housing so as to emit light through the window. A post is secured to a positioning assembly within the body. The positioning assembly includes: a first motor operable to rotate the housing in a first plane with respect to the post, and a second motor operable to rotate the housing in a second plane with respect to the post.

17 Claims, 6 Drawing Sheets

FIG. 6A
FIG. 6A
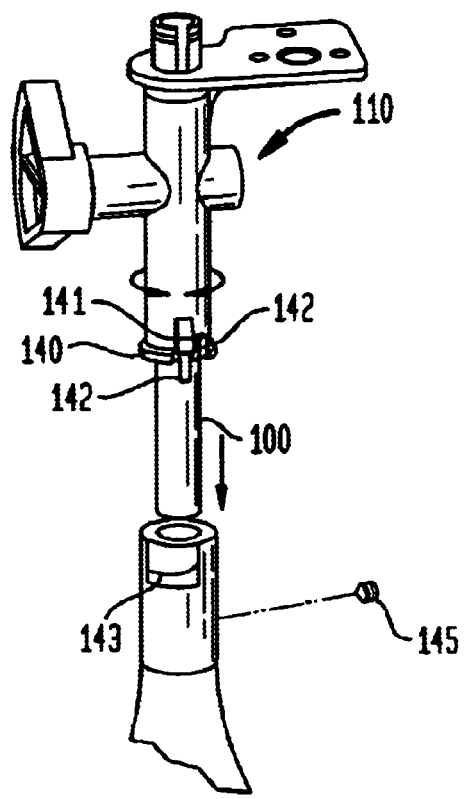
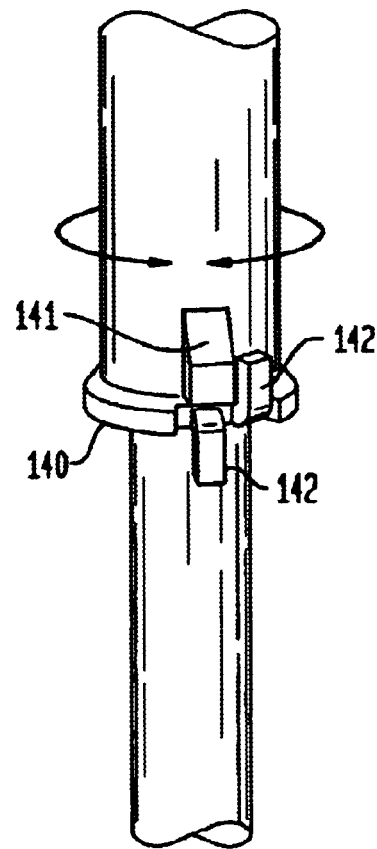

US 6,786,622 B1

SEARCHLIGHT AND CONTROLLER THEREFORE

FIELD OF INVENTION

The present invention pertains to electrically operated, remote-controlled lamps capable of being selectively pointed in a plurality of horizontal and vertical orientations.

BACKGROUND OF THE INVENTION

As discussed in U.S. Pat. No. RE29,266 entitled MOTOR CONTROLLED LAMP, reissued Jun. 14, 1977 (hereinafter referred to as the '266 patent), a number of applications exist where it is desirable to mount an adjustable lamp, such as a floodlight, searchlight, or spotlight, upon a vehicle, boat or other installation whereby the lamp may be remotely operated such that the light beam can sweep both horizontally and vertically. Spotlights for automobiles, for instance, have long been available wherein the control mechanism for the spotlight passes through a windshield pillar or wall of the vehicle passenger compartment and protrudes into the compartment, wherein the control handle is accessible to the occupant. However, it is often desired to place an adjustable lamp at a location remote from the cab of a vehicle, or at the bow or stern of a boat. This type of installation usually calls for an electrically controlled lamp in that other types of lamp control are difficult to install when the control apparatus is spaced more than a few feet from the lamp itself.

According to the prior art, the problem of protecting the connecting cables to the lamp and motor drives is normally accomplished by stop limits or other clutch means to prevent the cabling from being damaged as the motor is driven beyond the limits of the cabling configuration.

For example, the '266 patent teaches a motor controlled lamp. In this patent there is described a lamp being controllable from a remote location utilizing a pair of reversible electrical motors which are mounted within the lamp housing. Friction clutch means are included between the gears and the associated components. The arrangement requires stop means relating to the vertical axis of adjustment. Although the arrangement as disclosed in the '266 patent does not require conductor rings and brushes, it does require the use of friction clutch means and stop means to accomplish the adjustment of the lamp and limitation of movement in the vertical and horizontal directions.

U.S. Pat. No. 4,930,057 entitled SEARCHLIGHT DRIVE MEANS AND APPARATUS (hereinafter referred to as the '057 patent) addresses shortcomings of the '266 patent device and teaches a searchlight in which a lamp is mounted in a lamp housing for horizontal movement, vertical drive means is also mounted within the lamp housing for vertically driving the lamp. A base thereof mounts the lamp housing and a horizontal drive means drives the lamp and lamp housing in a horizontal plane less than 360 degrees.

The '057 patent invention provides a reversible drive in which a gear having less than 360 degrees of gear teeth, and a ramp portion at the end of each of the gear teeth is engaged by a pinion which is selectively reversed so that the pinion drives the gear in one direction until the pinion reaches the ramp portion, and continues to rotate in the one direction until it is reversed to move down the ramp portion and drive the gear in the other opposite direction.

It is an object of the present invention to provide a simplified searchlight which can be mounted either horizontally or vertically, and yet provide mobility in both the horizontal and vertical directions.

SUMMARY OF INVENTION

A light beam emitting device including: a housing including first and second ends; a window in the first end of the housing; a lamp disposed within the housing so as to emit light through the window; a post; and, a positioning apparatus secured to the post and within the body, the positioning apparatus including: a first motor operable to rotate the housing in a first plane with respect to the post, and a second motor operable to pivot the housing in a second plane with respect to the post.

BRIEF DESCRIPTION OF THE FIGURES

Various advantages of the invention will become more apparent by reading the following detailed description in conjunction with the drawings, which are shown by way of example only, wherein:

FIG. 6A is a partially exploded isometric view of the vertical pivot post, pivot shaft and neck portion according to the present invention; and, FIG. 6B is an enlarged view of a portion of FIG. 6A.

DETAILED DESCRIPTION OF THE INVENTION

Figure 1:
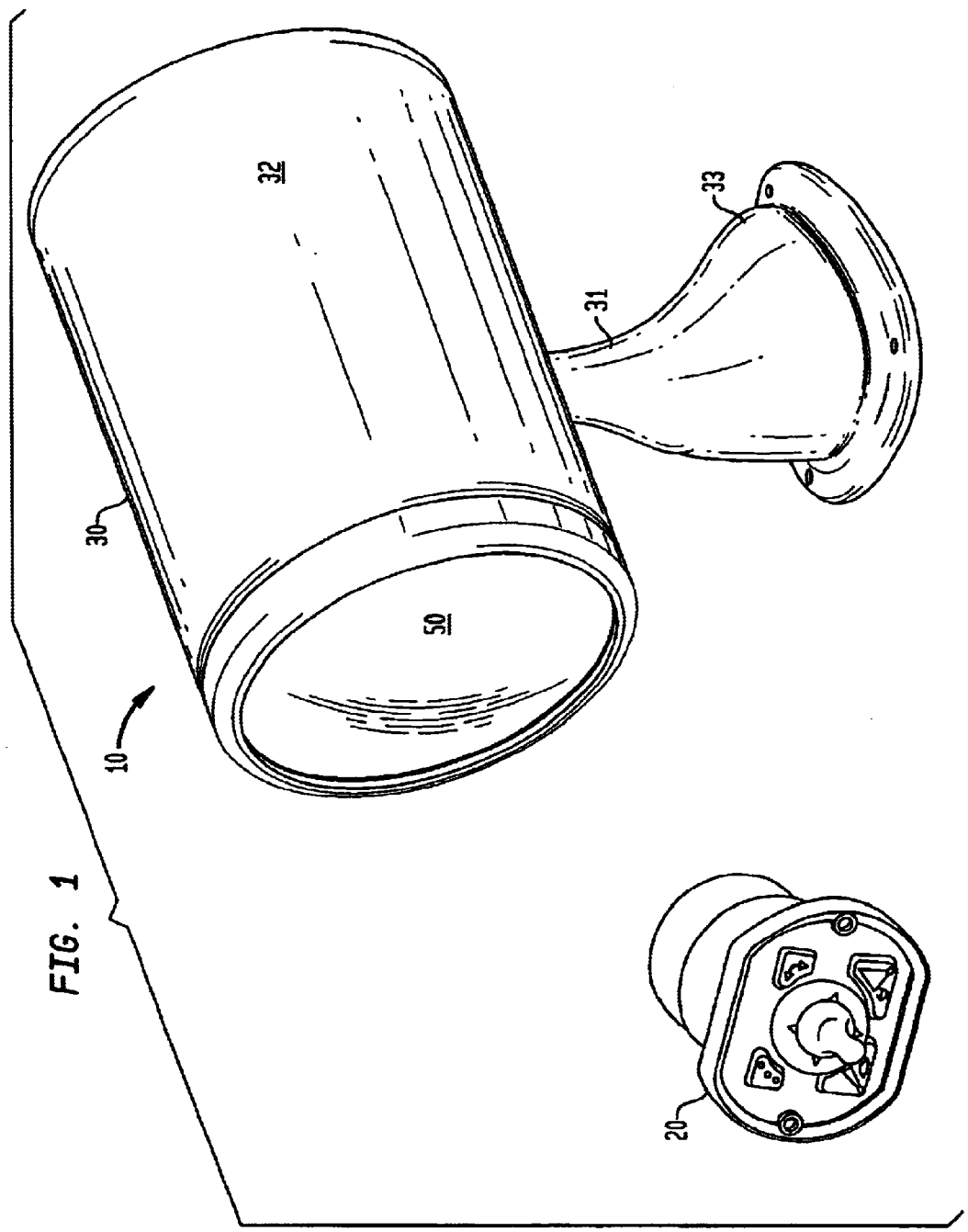
FIG. 1 is an isometric view of a controller and searchlight according to the present invention.

Referring now to the FIGS, like references identify like elements of the invention. FIG. 1 illustrates an isometric view of a searchlight 10 and controller 20 according to a preferred form of the present invention. Searchlight 10 generally includes a housing 30 which supports a lamp 40 therein. The housing 30 can be seen to take the form of a generally cylindrical portion 32, and a neck portion 31 attached to a mounting portion 33. The cylindrical portion 32 includes a window 50 in a first longitudinal end thereof, which the lamp 40 emits light through in operation.

Figure 2:
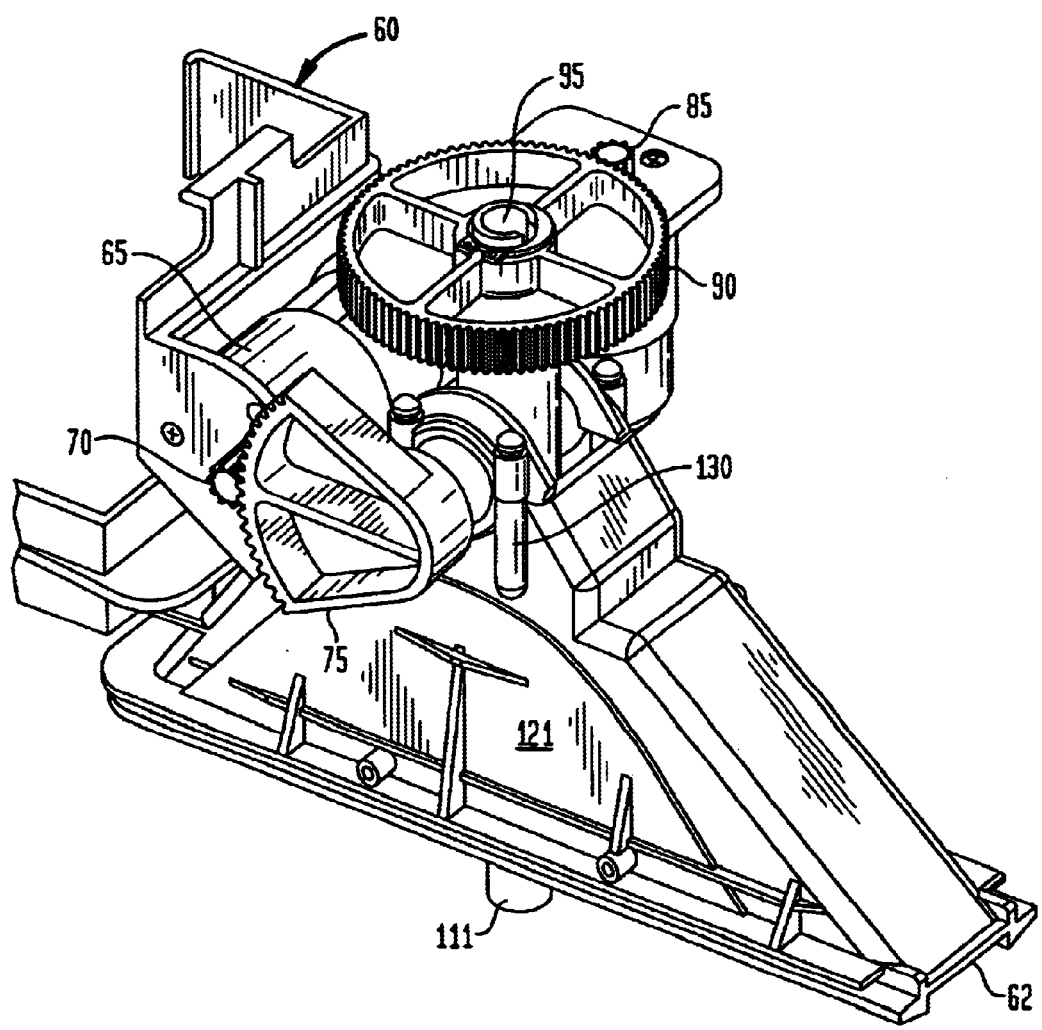
FIG. 2 is a first isometric view of a support and pivot mechanism assembly according to the present invention.
Figure 3:
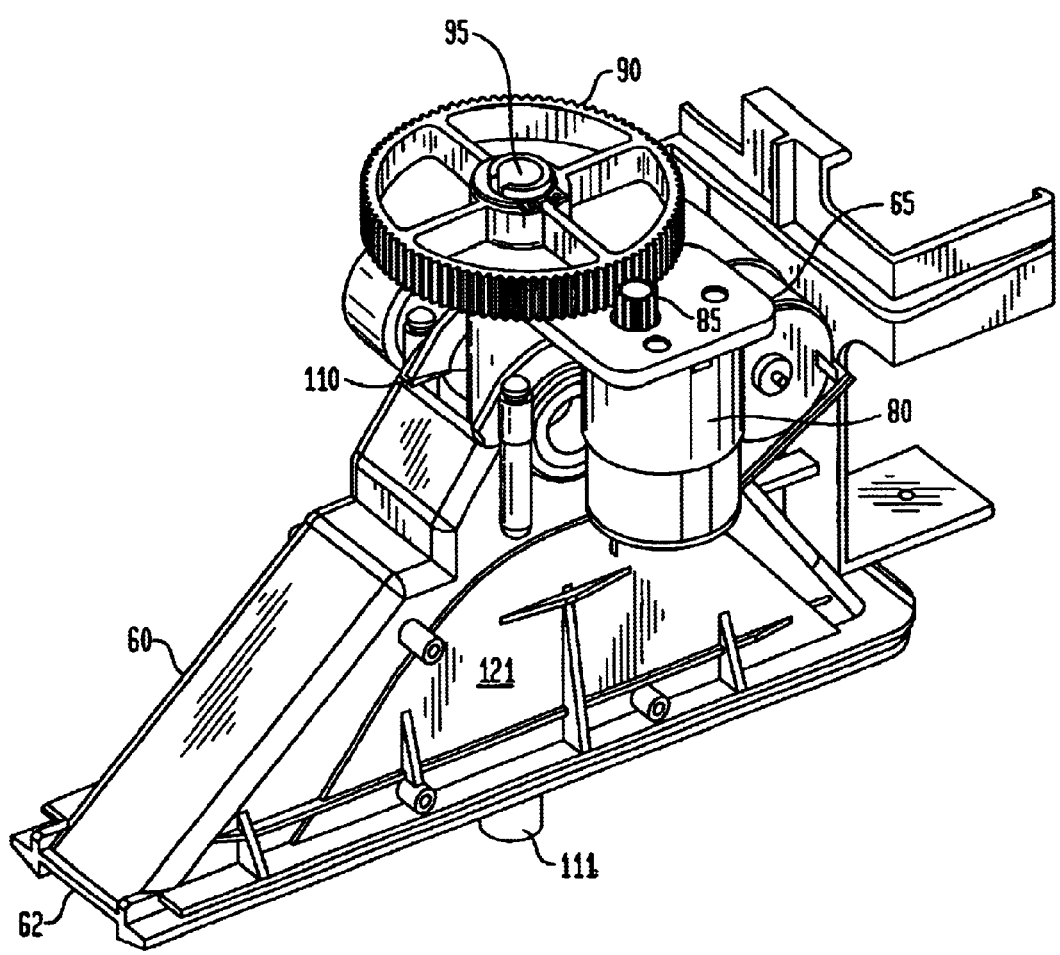
FIG. 3 is a second isometric view of the support and pivot mechanism assembly of FIG. 2.
Figure 4:
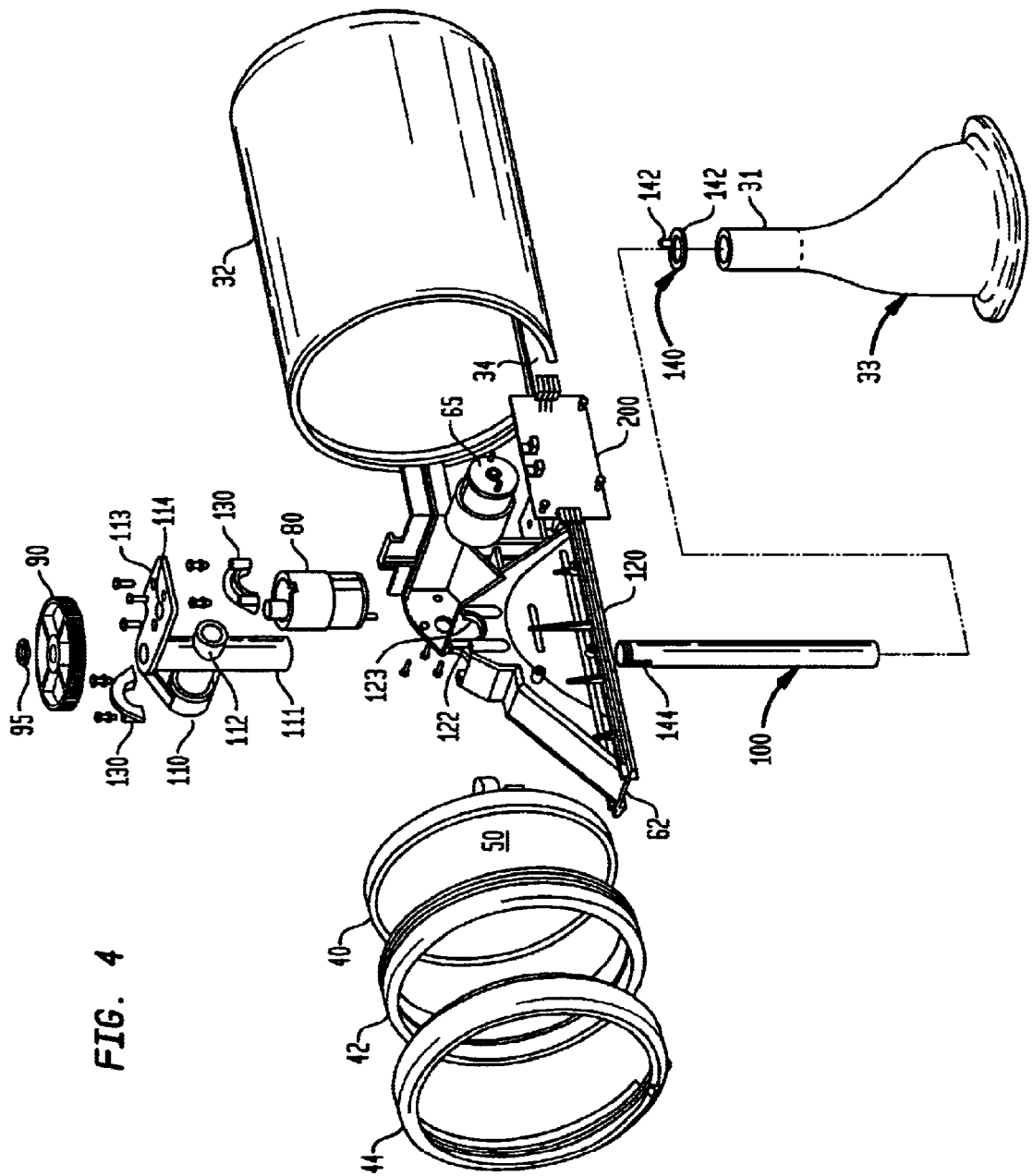
FIG. 4 is an isometric view of the searchlight of FIG. 1 in an exploded state.

Referring now to FIGS. 2 and 3, therein are illustrated first and second isometric views of a support pivot mechanism assembly or apparatus 60 suitable for use with the searchlight 10 and controller 20 of FIG. 1. Referring now also to FIG. 4, the support pivot mechanism assembly 60 of FIGS. 2 and 3 is secured within the cylindrical housing portion 32. The assembly 60 includes first and second motors 65, 80. The motor 65 has a 10-toothed fixed gear 70 positioned on the motor shaft thereof, which engages a 23-toothed section gear 75 in an upward and downward direction, on one axis. The second motor 80 of the assembly 60 drives a 10-toothed fixed gear 85 positioned on the motor shaft thereof, which drives against an 82-toothed fixed gear 90 secured to a pivot shaft 100 with a snap ring 95. This preferably enables horizontal rotation of the housing 32 for 380-degrees on an axis that perpendicularly intersects the upward-downward axis of the gear 75 with respect to the pivot shaft 100. These motors 65, 80 are fixed with fasteners such as, screws, to a vertical pivot post 110 and a horizontal support assembly 120, respectively. The section gear is fixed with respect to the vertical pivot post 110, and the gear 90 is fixed with respect to the shaft 100.

The vertical pivot post 110 generally takes the form of an elongated tubular portion 111 having a second tubular portion 112 integrally formed therewith such that center, longitudinal axes thereof intersect in a perpendicular manner. Additionally, the vertical pivot post 110 includes a planar portion 113 integrally formed with the tubular portion 111 and having an aperture 114, such that the drive shaft of the motor 80 passes through the aperture 114 when the motor 80 is secured to the planar portion 113. The tubular portion 111 is positioned such that the pivot shaft 100 is partially received thereby, passes there through, then through the gear 90 and is secured by the snap-ring 95.

The horizontal support assembly 120 generally includes a triangular shaped member 121 having a triangular shaped aperture 123 passing longitudinally there though so as to accommodate the tubular portion 111 of the vertical pivot post 100 and pivot shaft 100. At an apex of the member 121 is pivot groove 122, i.e. a semicircular recess, positioned and sized to receive the tubular portion 112 of the vertical pivot post 110 when the portion 111 of the vertical pivot post 110 is inserted into the aperture 123.

The vertical pivot post 110 is fixed to the horizontal motor support 120 using four fasteners, such as screws, and two capped covers 130 at the pivot arms at the horizontal motor support's 120 pivot groove 122.

As the section gear 75 is fixed with respect to the vertical pivot post 110, operation of the motor 65 causes the gears 70, 75 to engage, drive gear 70 up or down the section gear 75 depending upon the direction of operation of the motor 65, and thus pivot the horizontal support member 120 in a corresponding upward or downward direction with reference to the vertical pivot post 110 and shaft 100. Thus as the vertical pivot post 110 is pivoted up and down by the motor 65, so is the horizontal motor support 120.

Motor 80 is secured to the horizontal motor support 120 using suitable fasteners, such as screws. Hence, motor 80 is fixed with respect to the horizontal support assembly 120. Further, as set forth the gear 90 is fixed with respect to the shaft 100. Thus, operation of the motor 80 causes the gears 85, 90 to engage, which drives gear 85, and hence the motor 80 and horizontal support assembly 120 about the gear 90, and hence the shaft 100. This rotates the assembly 60 horizontally about the pivot shaft 100.

The cylindrical housing portion 32 preferably includes a track and open slot 34 running longitudinally, down a side-wall thereof The assembly 60 preferably includes a corresponding track portion 62 which can be slid down the track portion 34 from the open end of the cylindrical housing 32 that the window 50 is secured to during assembly, thereby securing the assembly 60 within the cylindrical housing portion 32 of the search light 30. Thus, as the assembly 60 is rotated and pivoted by operation of the motors 65, 80, so is the housing portion 32.

Referring now also to FIGS. 6A and 6B, an exterior surface of the tubular portion 111 preferably includes a stop portion 141 and an interior surface of the neck portion 31 includes a travel channel 143. Further, a locking stop washer 140 with stand-up tabs 142 is added around the shaft 100 such that one of the tabs 142 interacts with the stop portion 141 and the other interacts with the interior travel channel 143 of the neck portion 31. The tabs 142 and corresponding stop and channel 141, 143 keep the vertical pivot post 110 from horizontally and continuously rotating in one direction.

The stop washer tabs 142 which protrude from the stop washer 140 are preferably offset from one another by about 20°. The one of the tabs 142 which interacts, i.e. comes to bear against, the stop 141 and the stop 141 provide approximately 350° of rotation of the vertical pivot post 110 with respect to the shaft 100. The one of the tabs 142 which interacts with the channel 143, and the channel 143 provide approximately 90° of rotation of the vertical pivot post 110 and shaft 100 relative to the neck portion 31. These ranges of rotation preferably overlap by approximately 60° providing a total range of rotation of the vertical pivot post 110, and hence housing 32 with respect to the neck portion 31 of approximately 380°. This advantageously prevents entangling of wires that pass through the neck portion 31 and are coupled to circuit board 200, and hence to the motors 65, 80 due to excessive rotation of the light 10 in a single horizontal direction, i.e. due to rotation around gear 90 by motor 80 in a single direction.

The shaft 100 is preferably hollow and protrudes out from the cylindrical housing 32. The stop washer 140 is preferably inserted there over as has been set forth. The shaft 100 is inserted into the base 33, and secured using two set screws 145 through the base 33. The hollow interior of the shaft 100 serves for confining there within a wiring harness or conduit (not shown) which supplies electrical contact to the motors 65, 80, lamp 40 and circuit board 200.

Advantageously, by securing the base 33 to a fixed surface using any suitable method, e.g. screws or bolts and nuts, the searchlight 10 can be secured in an upright disposition, completely inverted, or a lateral, side-mounting without any diminution of the functioning thereof. The novel pivoting arrangement on two axis satisfies the necessary radial and thrust functions for the combination, and provides lateral stability thereto.

Referring again to FIG. 4, a lamp 40, lamp seal 42, and lamp-retaining ring 44 are fixed using a suitable fastener over the open end of the cylindrical housing 32 through which the assembly 60 was slid. The lamp 40 preferably takes the form of a sealed beam light bulb, although other suitable light-emitting devices can also be used. Thus, as the motors 65, 80 are selectively activated, the unit 60 and hence the cylindrical portion 32 of the lamp rotates and pivots about the shaft 100 in horizontal and vertical directions, respectively.

A printed circuit board 200 with suitable microprocessor is attached with fasteners such as screws, to the assembly 60 and controls an electrical circuit which selectively provides electrical energy to the motors 65, 80 on demand, which in turn control operation of the gears 75, 90 and hence the movement of the search light 10 with respect to the post 100.

Figure 5:
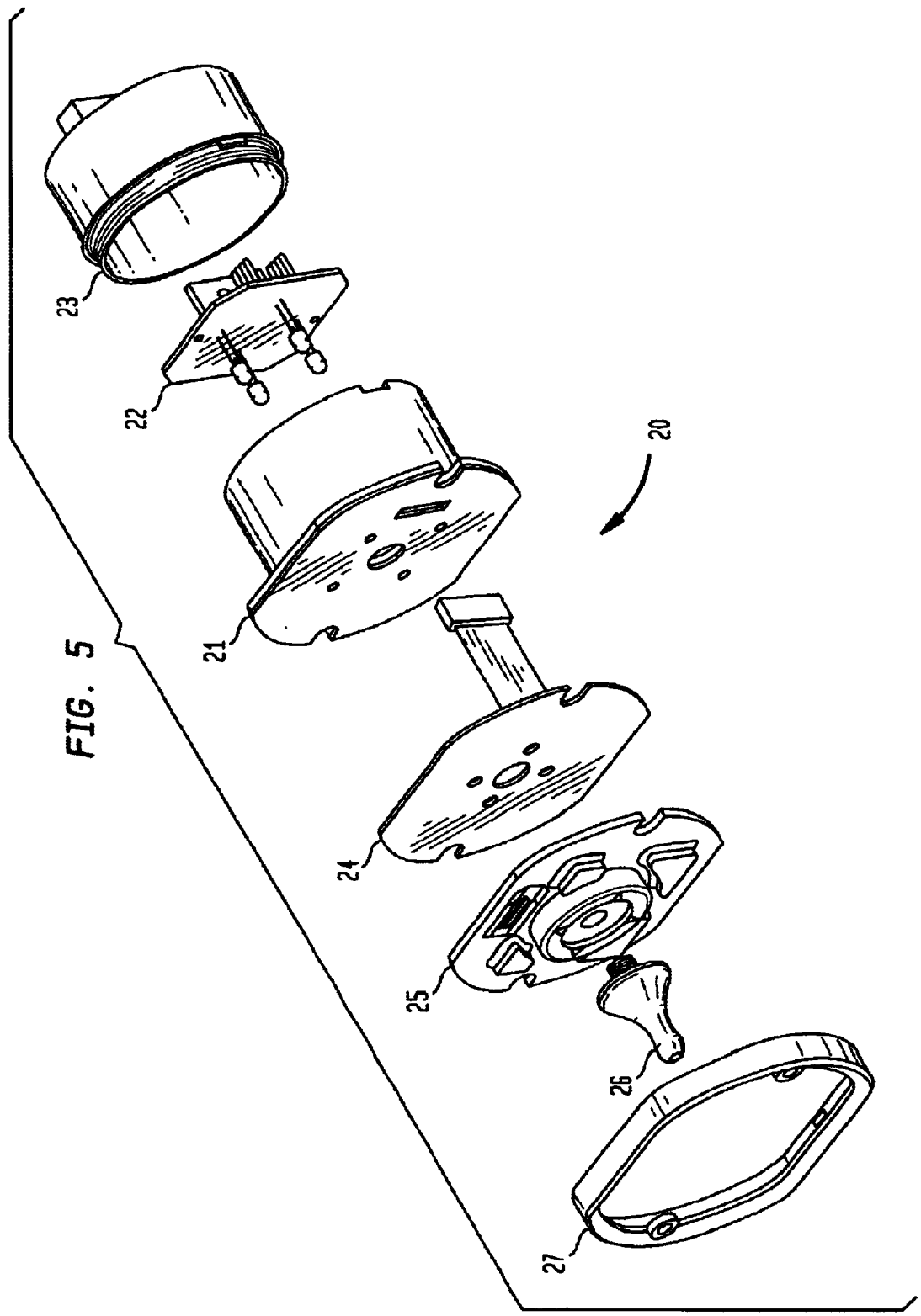
FIG. 5 is an isometric view of the controller of FIG. 1 in an exploded state.

Referring again to FIG. 1, and now also to FIG. 5, FIG. 5 shows an exploded view of a self contained controller 20 preferably used according to the present invention. Controller 20 generally includes, a cylindrical hollow housing 23, a printed circuit control board 22 mounted inside an upper housing portion 21. The hollow housing 23 is securable to the upper housing 21. A double sided printed open control circuit Mylar switch board 24 is affixed to the upper housing 21 using a suitable adhesive. An aperture is included within the upper housing 21 such that a straight line pin connector from the Mylar switch 24 is passed through it and electrically coupled to the printed circuit control board 22. A formed silicone rubber heat pad 25 is attached with a suitable adhesive to the Mylar switch 24. A threaded joystick type apparatus 26 is threaded into a dome fixed insert inside the silicone rubber keypad 25 through the Mylar switch 24 and into a central threaded aperture of the upper housing 21.

When the directional joy stick 26 is pressed in any direction, carbon pads located on the back side of the silicone rubber key pad 25 closes contact of the Mylar switch 24, and a signal is sent via suitable electrical interconnection to the circuit board 200 of the search light 10. The circuit board 200 processes the received signal and directs operation of the motors 80, 65 accordingly. Using the joy stick controller 26, a time designated international Morse code S-O-S sweep, or a time designated angular sweep function can increment by assigned degrees, adjust the spot light in a slow motion made horizontally or vertically, or movement of the flood light in a fast mode horizontally or vertically can be achieved. Each key of the keyboard 25 is preferably backlit using a suitable lamp such as an individual LED secured to the printed circuit board 22 which is energized when an electrical power source is activated. A snap on bezel 27 can be added for aesthetic appeal, and aiding and mounting of the controller to a desired surface.

Although the invention has been described and pictured in a preferred form with a certain degree of particularity, it is understood that the present discloser of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

I claim:

1. A searchlight device comprising:
    a housing including a first end;
    a window in the first end of said housing;
    a lamp disposed within said housing so as to emit light through said window;
    a shaft;
    a positioning assembly secured within said housing, said positioning assembly including: a first motor operable to rotate said housing in a first plane with respect to said shaft, and a second motor operable to pivot said housing in a second plane with respect to said shaft;
    a first gear secured with respect to said shaft, and a second gear rotatable by said first motor, wherein operation of said first motor causes said first and second gears to engage and rotate said assembly about said shaft in said first plane; and
    a washer including a plurality of tabs positioned so as to limit said rotation of said assembly by said first motor to a predetermined rotational angle.

2. The device of claim 1, wherein said first and second planes are different.

3. The device of claim 2, wherein said first and second planes are substantially perpendicular to each other.

4. The device of claim 1, wherein said housing is substantially cylindrical.

5. The device of claim 1, further comprising an elongated neck, wherein said shaft passes through said neck into said housing.

6. The device of claim 1, wherein said positioning assembly further comprises a vertical adjustment assembly including first and second perpendicular tubular members and a planar portion, said first motor is secured to said planar portion, and said shaft passes through said first tubular portion.

7. The device of claim 6, wherein said positioning assembly further comprises a horizontal adjustment member including a recess for at least partially receiving said second tubular portion and said second motor.

8. The device of claim 1, wherein said rotational angle is approximately 380 degrees.

9. The device of claim 1, further comprising a first section gear being fixed with respect to said positioning assembly and a third gear being rotatable by said second motor, whereby operation of said second motor causes said first section gear and said third gear to engage thereby causing said third gear to travel along said first section gear and pivot said housing in said second plane.

10. The device of claim 1, further comprising a controller electrically coupled to said first and second motors for selectively operating said first and second motors to orient said window so as to emit light in a plurality of directions in said first and second planes.

11. The device of claim 1, further comprising a controller secured within said housing and electrically coupled so as to selectively operate said first and second motors.

12. A positioning assembly for orienting a searchlight in a plurality of directions with respect to a positioning shaft, said positioning assembly comprising:
    a body including substantially perpendicularly disposed first and second surfaces;
    a first motor secured to said first surface and including a drive shaft;
    a second motor secured to said second surface and including a drive shaft;
    a first gear secured to said drive shaft of said first motor;
    a second gear secured to said drive shaft of said second motor;
    a third gear fixed with respect to said positioning shaft and engaged by said first gear; and,
    a section gear secured with respect to said body and engaged by said third gear;
    wherein, operation of said first motor rotates said assembly about said shaft and operation of said second motor pivots said assembly with respect to said shaft.

13. The device of claim 12, wherein said first and second surfaces are in first and second planes, respectively and said rotation is in said first plane and said pivoting is in said second plane.

14. The device of claim 13, wherein said first and second planes are substantially perpendicular to each other.

15. The device of claim 12, wherein said assembly further comprises a vertical adjustment assembly including first and second perpendicular tubular members and a planar portion, said first motor is secured to said planar portion, and said shaft passes through said first tubular portion.

16. The device of claim 15, wherein said assembly further comprises a horizontal adjustment member including a recess for at least partially receiving said second tubular portion and said second motor.

17. The device of claim 12, further comprising a controller electrically coupled to said first and second motors for selectively operating said first and second motors to orient said window so as to emit light in a plurality of directions in said first and second planes.

* * * * *